3,539,527
STABILIZED STYRENE-ACRYLONITRILE
POLYMER COMPOSITIONS
Walter Stamm, Tarrytown, N.Y., assignor to Stauffer Chemical Company, New York, N.Y., a corporation of Delaware
No Drawing. Filed May 10, 1968, Ser. No. 728,360
Int. Cl. C08f 45/58, 45/62
U.S. Cl. 260—45.7
13 Claims

ABSTRACT OF THE DISCLOSURE

High molecular weight styrene-acrylonitrile polymer compositions exhibiting a high degree of stability containing a stabilizing amount of a stabilizing compound having the formula:

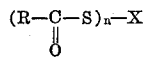

wherein R is a hydrocarbyl group containing from 3 to about 21 carbon atoms, $n$ is an integer having a value of from 1 to 2, X is selected from the group consisting of hydrogen, alkali metal, alkaline earth metals and acyl moieties having a hydrocarbyl essentially hydrocarbon residue and containing from about 1 to about 17 carbon atoms inclusive. These stabilizers have proven to be particularly effective in acrylonitrile - butadiene - styrene copolymer compositions. Included among the preferred stabilizers are: thiollauric anhydride, thiololeic anhydride, thiolbenzoic anhydride and thiolstearic anhydride. This stabilizing system is one of the few proposed for styrene-acrylonitrile type resins which is not based on a hindered phenol.

---

The present invention relates to the stabilization of styrene-acrylonitrile polymers against degradation and discoloration due to heating. Still more particularly, the invention relates to the heat stabilization of such styrene polymers employing certain thiol acids and derivatives thereof which are hereinafter defined.

It is well known that styrene-acrylonitrile polymers and, in particularly, styrene-acrylonitrile polymer compositions containing butadiene polymerized therein, degrade at the elevated temperatures required for operations such as blending, molding and shaping. While this problem is not acute in respect to styrene homopolymer, the subject copolymers are acutely affected particularly when such copolymers contain a polymerized diene. In order to overcome the problem, a suitable amount of a heat stabilizing composition is generally blended with a styrene-acrylonitrile copolymer material prior to molding or blending. One suitable component of commercial stabilizing compositions employed widely today is the hindered phenol type stabilizer such as 2,6-di-t-butyl-p-cresol. Aryl amines represent another class of stabilizer materials. These materials provide satisfactory stabilization, but each has certain deficiencies such as color formation, cost, toxicity and stability.

In accordance with the present invention, the stabilized styrene-acrylonitrile copolymer compositions are provided which contain as a stabilizer, an effective amount of a compound of the type:

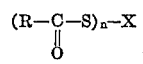

wherein R is a hydrocarbyl group consisting essentially of hydrogen and carbon having from 5 to 21 carbon atoms and preferably from 6 to 17 carbon atoms, $n$ equals 1 or 2, and X is selected from the group consisting of hydrogen, alkali metal including ammonium, alkaline earth metals, and an acyl moiety of the type

wherein R' is a hydrocarbyl group consisting essentially of hydrogen and carbon containing from about 1 to about 17 carbon atoms inclusive. The term "consisting essentially of hydrogen and carbon" refers to substituted hydrocarbon moieties containing an occasional or infrequent substituent comprising an element other than hydrogen and carbon, e.g., nitrogen or chlorine which does not materially alter the properties of the hydrocarbon residue, i.e., remains inert, as well as to purely hydrocarbon moieties. This invention is predicated upon the discovery that the incorporation of, for example, 3 percent of a compound above in a styrene-acrylonitrile polymer provides an unexpected improvement in polymer stability during heat processing. In the practice of the present invention it has been found that the incorporation of thiollauric anhydride into acrylonitrile - butadiene - styrene copolymer (ABS) in an amount such that the sulfur content of the mixture is as low as 0.1% by weight gives a particularly unexpected improvement in stabilization at high temperature.

Representative groups of compounds within the scope of the above-identified formula include the aliphatic thiol acids such as the fatty thiol acids, alkali metal soaps of the fatty thiol acids, alkaline earth metal soaps of the fatty thiol acids, as well as the fatty thiolanhydrides; aromatic thiol acids, alkali metal salts of the aromatic thiol acids, alkaline earth salts of the aromatic thiol acids, as well as the aromatic thiol anhydrides.

Representative of specific compounds suitable for use in accordance with the present invention include the thiolcaproic, thiolenanthic, thiolcaprylic, thiolpelargonic, thiolcapric, thiolundecanoic, thiollauric, thioltridecanoic, thiolmyristic, thiolpentadecanoic, thiolpalmitic, thiolmargaric, thiolcarboxylic analogs of so-called neo-acids, thiolstearic, thiolnonadecanoic, thiolarachidic and thiolheneicosanoic acids, thiolnaphthenic acid, thiolbenzoic aicd, phenylthiolacetic acid, methylthiolbenzoic acid, tolylthiolacetic acid, naphthalenethiolcarboxylic acids, as well as the alkali and alkaline earth salts and anhydrides thereof. Compounds containing the same number of carbon atoms as the above but which have unsaturated bonds present, e.g., undecylenic, oleic and thiolcrotonic acids, etc., are likewise suitable.

Representative of preferred specific compounds within such groups include thiolstearic acid, thiolpalmitic acid, thiolversatic acid, thiollauric acid, thiolbenzoic acid, thioltoluic acid, thiolmesitoic acid, zinc thiolstearate, calcium thiolstearate, cadmium thiolstearate, barium thiolstearate, magnesium thiolpalmitate, zinc thiollaurate, cadmium isododecanoate, mixed thiol fatty acid soaps, zinc thiololeate, thiolstearic anhydride, stearic palmitic thiolanhydride, thiolbenzoic anhydride, thiollauric anhydride, potassium thiololeate, soaps of thioltallates, dodecenyl succinic thiolanhydride, thiolphthalic and thioltetrahydrophthalic anhydride, and the like, as well as mixtures of such compounds.

The following compounds are illustrative of the essentially hydrocarbon moieties containing an occasional and infrequent, inert substituent other than hydrogen and carbon: alpha-hydroxythiolstearic acid, 9,10-dihydroxythiolstearic anhydride, zinc 11 - aminothiolundecanoate, nitro and chlorothiolbenzoic anhydrides.

As indicated above, compounds of the type set forth in the foregoing are useful in improving the thermal stability of styrene-acrylonitrile polymers.

By the term styrene-acrylonitrile polymers, is intended any polymer containing copolymerized styrene and acrylonitrile monomer. These polymers are all well known in the art and include styrene acrylonitrile copolymer (SAN) as well as copolymers containing additional copolymerizable monomers, copolymerized therein, such as styrene-acrylonitrile-methylmethacrylate, styrene-acrylonitrile - ethylmethacrylate, styrene-acrylonitrile-butadiene (ABS), styrene-acrylonitrile - butadiene - methylmethacrylate copolymer and the like.

The term styrene as used herein is intended to include such polymerizable monomers as styrene, alpha methyl styrene, chlorostyrene and the like. These monomers and their use as copolymerizable monomers with acrylonitrile and with acrylonitrile and other copolymerizable monomers are well known in the art. Accordingly, they require no further definition here.

The stabilizers of the present invention are particularly applicable to the styrene-acrylonitrile-butadiene copolymers commonly referred to as the "ABS rubbers," which are generally of two types (types B and G). Type B is a mechanical blend of styrene-acrylonitrile copolymer and butadiene-acrylonitrile copolymer. Type G is composed of a mixture of styrene acrylonitrile copolymer and a graft of styrene-acrylonitrile onto polybutadiene and varying amounts of ungrafted polybutadiene. A thorough discussion of the ABS plastics can be found in "ABS Plastics" by Basdekis, Reinhold Plastic Application series, Reinhold Publishing Company, 1964.

In the styrene-acrylonitrile copolymers the styrene is generally present in an amount in excess of 25% by weight and usually present in an excess of 50% by weight. Styrene-acrylonitrile copolymer per se generally varies between 65/35 and 76/24 on a weight ratio.

While the stabilizer compounds in accordance with those of the present invention exhibit marked improvement over closely related compounds in the prior art when employed alone, or in various combinations thereof, it is understood that the compounds of the present invention can be even more advantageously employed in combination with costabilizing additives known in the art which include, for example, chemical compounds of the type: organic phosphites, phenolic compounds including hindered or alkyl substituted phenols, barium or cadmium phenolates, phosphinates, phosphonates, mercaptides and sulfides, as well as other additives known in the art of styrene-acrylonitrile polymer stabilization.

It is apparent that the percentage of the fatty thiol compound of the present invention which must be employed in making satisfactory heat stabilized compositions of the present invention in order to achieve the satisfactory improvement in heat stability, will vary over a wide range, depending upon the particular styrene-acrylonitrile copolymer composition in which it is employed, the particular need for stabilization, the particular end use of the resin, the presence of other costabilizing additive materials, as well as the time and temperature processing requirements in making a suitable final product. The presence of between about 0.01% and about 10% by weight of the stabilizer compound of the present invention will be sufficient for most applications, although the preferable range is between about 1% and about 5% of said compound on a weight basis.

The thiol acids and anhydrides useful in the present invention can be prepared in accordance with procedures known in the literature as well as from the novel procedures hereinafter specified. Thiolstearic acid, for example, can be prepared from stearoyl chloride and hydrogen sulfide as well as from stearoyl chloride and alkali or alkaline earth salts of hydrogen sulfide. In the practice of the present invention, thiolstearic acid (M.P. 37°–41° C.) has been prepared from stearoyl chloride and hydrogen sulfide in 96 percent yield employing pyridine as an HCl acceptor. The preparation of certain other thiol acids, e.g., thiolmyristic, thiolbenzoic, as well as thiolpalmitic acids has likewise been reported in the literature. They can also be obtained by cleavage of acid anhydrides with hydrogen sulfide. In general, the organic thiol acids are practically colorless at room temperature.

It is contemplated that thiol acids can be produced in accordance with two separate processes as follows. Firstly, the production of such acids is contemplated by the reaction of the desired carboxylic acid, e.g., decanoic acid with phosphorus pentasulfide ($P_2S_5$) to produce the corresponding thiol acid, e.g., thioldecanoic acid. The thiol acid is then separated from the side products, e.g., dithiolacids, remaining carboxylic acid and phosphorus pentasulfide, for example, by distillation. Another contemplated process route involves the cleavage of fats or other esters of fatty acids employing either hydrogen sulfide under an elevated pressure in the presence of catalysts or salts of hydrogen sulfide. Hydrogen sulfide pressure in the range of from 100 to 1000 p.s.i. are believed to be suitable for this purpose. The reaction is represented formulistically below with a glyceride, or fat, wherein R represents a suitable aliphatic hydrocarbon moiety hereinbefore defined:

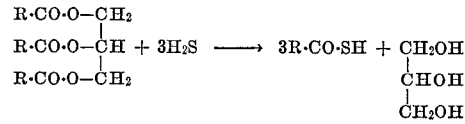

The above represented process appears highly attractive from an economic standpoint since the glycerides are readily available in commerce at low cost, e.g., tallow fats, and accordingly is recommended.

The alkaline earth metal soaps of thiol acids such as the respective zinc, cadmium, calcium and barium soaps of thiolstearic acid are also useful compounds in the practice of the present invention. It has been found that the soaps useful in the present invention can be prepared, e.g., by metathetical exchange reactions between a suitable alkali thiolstearate salt and a salt of an alkaline earth metal. The soaps can also be produced by the reaction of alkaline earth oxides, acetates, carbonates, for example, with fatty thiol acids. Illustrations of the preparation of these compounds as well as the preparation of thiolstearic anhydride and thiolbenzoic anhydride are presented below.

ILLUSTRATION I

Zinc thiolstearate

To 62 grams (0.203 mole) of thiolstearic acid in 500 milliliters of ethanol was added 13.35 grams (0.203 mole) of 85% pure potassium hydroxide, dissolved in 125 milliliters of alcohol, with stirring at 40° C. The agitated slurry was then warmed up to 50° C. After 30 minutes 13.6 grams (0.101 mole) of anhydrous zinc chloride was added, dissolved in 300 milliliters of alcohol. The reaction mixture was warmed up to 70° C. for 30 minutes and then quickly filtered while hot. Upon cooling about 78 grams (approximately 60% of theory) of zinc thiolstearate crystallized out. More product was obtained from the mother liquor. The melting point of pure zinc thiolstearate was 92°–95° C.

ILLUSTRATION II

Barium thiolstearate

To the slurry of 36 grams of thiolstearic acid in 500 milliliters of ethanol was added 72 grams of a 77% pure KOH in ethanol. After 30 minutes a hot, 50% aqueous ethanol solution containing 31.6 grams of barium nitrate was added to the hot, agitated potassium thiolstearate solution. After 10 minutes the hot reaction mixture was filtered and the filtrate cooled. A crystalline precipitate was recovered in practically quantitative yield. It was washed with hot water and dried over $P_2O_5$; M.P. 162°–166° C.

ILLUSTRATION III

Thiolstearic anhydride

To 2.0 grams (0.066 mole) of thiolstearic acid in 50 milliliters of carbon tetrachloride are added 2.1 grams (0.069 mole) of stearoyl chloride and ten drops of pyridine at 40°–50° C. After one hour pyridine hydrochloride is removed by filtration, and the filtrate is evaporated to dryness. The resultant solid (5.3 grams; M.P. 76–79° C.) is recrystallized from heptane: M.P. 78–79° C.; yield practically quantitative. The compound has a sharp band in the I.R. at 5.75 $\mu$ and analyzes correctly.

ILLUSTRATION IV

Preparation of thiolbenzoic anhydride

In 300 milliliters of hot water was dissolved 140 grams of 60% aqueous sodium sulfide. To this solution were added three grams of a commercial wetting agent[1] and 90 grams of disodium acid phosphate hydrate as buffer. After cooling the mixture to 0° C., 280 grams of benzoyl chloride were added with continued stirring of the mixture. The batch temperature was kept below 15° C. throughout. Thiolbenzoic anhydride was filtered from the reaction mixture, washed with cold water and dried under vacuum at 35° C. The product had a melting point of 47–49° C. and was recovered in 96% yield.

ILLUSTRATION V

Preparation of thiollauric anhydride

In a reaction flask provided with a stirrer, dropping funnel and an efficient cold water condenser were dissolved 21.6 grams (0.1 mole) of thiollauric acid in 50 milliliters of benzene. A constant stream of dry nitrogen was sparged through the agitated solution which was warmed up to 60° C. Then 22 grams of distilled lauroyl chloride were slowly added to the reactor through the dropping funnel. The addition was completed in about 30 minutes, and the reaction was brought to completion by stirring the mixture for about four hours at reflux temperature. A small amount of pentane (about 20 milliliters) was then added to the solution which was cooled down to room temperature. Thiollauric anhydride crystallized out in good yield and high purity. Melting point 52°–54° C.

ILLUSTRATION VI

Preparation of thioloteic anhydride

Molar quantities of thiololeic acid and oleoyl chloride were reacted under conditions practically identical to those employed in Illustration V. Thiololeic anhydride was isolated as a colorless oil which was analytically pure without distillation.

ILLUSTRATION VII

Preparation of thiolstearic/thiolbenzoic anhydride

One mole of thiolstearic acid is charged to a reaction vessel containing 500 milliliters of benzene as solvent. One mole of benzoyl chloride is added and the reaction is heated to reflux and maintained at reflux for approximately 3 hours. The product is recovered by removal of the solvent.

The mixed thiolstearic/thiolbenzoic acid anhydride provides excellent stability and compatibility with SAN and ABS resin compositions.

ILLUSTRATION VIII

Preparation of thiolstearic/thiolacetic anhydride

This compound is prepared in a manner identical to that of Illustration VII except that one mole of acetyl chloride is used in place of the benzoyl chloride.

While the alkaline earth metal soaps of the thiol acids set forth above provide stabilization to the styrene-acrylonitrile copolymers, it is preferred to employ the thiol acids or the thiol anhydrides per se as stabilizers as these compounds provide enhanced stabilization.

In the examples which follow and throughout this specification, all parts and percentages given are by weight unless otherwise specified.

EXAMPLE 1

Each stabilized styrene-acrylonitrile copolymer compositions set forth below are prepared by blending the particular polymer composition as indicated with 1% by weight of one of the following thiol stabilizers of this invention. The various formulations are blended until a homogeneous composition is obtained. They are then subjected to a conventional milling test to determine dynamic heat stability. These compositions are found to exhibit improved thermal stability.

Polymers of the formulation

1. Styrene-acrylonitrile butadiene copolymer (ABS Type B).
2. Styrene-acrylonitrile butadiene copolymer (ABS Type G).
3. Styrene-acrylonitrile copolymer containing 65 parts styrene to 35 parts acrylonitrile.
4. Styrene-acrylonitrile copolymer containing 76 parts styrene to 24 parts acrylonitrile.

Stabilizers

A. Thiolstearic anhydride    D. Thiollauric acid
B. Thiolstearic acid    E. Thiolbenzoic acid
C. Thiollauric anhydride    F. Thiololeic anhydride

What is claimed is:

1. A heat stabilized polymeric material which comprises a styrene-acrylonitrile copolymer and a stabilizing amount of a stabilizer compound of the type:

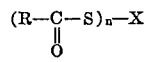

where R is a hydrocarbyl group consisting essentially of hydrogen and carbon having from 3 to 21 carbon atoms, $n$ is an integer from 1 to 2, and X is selected from the group consisting of hydrogen, alkali metal, alkaline earth metal, and an acyl moiety having a hydrocarbyl essentially hydrocarbon residue and containing from 1 to 17 carbon atoms inclusive.

2. The stabilized material of claim 1 in which R is an aliphatic essentially hydrocarbon group having from 6 to 17 carbon atoms in said stabilizer compound.

3. The stabilized material of claim 1 in which R is an aromatic group.

4. The stabilized material of claim 3 in which R is phenyl.

5. The stabilized material of claim 1 in which X represents hydrogen in said stabilizer compound.

6. The stabilized material of claim 1 in which said stabilizer compound is thiolstearic acid.

7. The stabilized material of claim 1 in which X represents an acyl moiety having an aliphatic essentially hydro- ---
[1] Aerosol AT trademark of American Cyanamid.

carbon residue in said stabilizer compound as defined in claim 1.

8. The stabilized material of claim 7 in which X represents an acyl moiety having a hydrocarbyl essentially hydrocarbon residue in said stabilizer compound which has from 6 to 17 carbon atoms.

9. The stabilized material of claim 8 in which said stabilizer compound is thiolstearic anhydride.

10. The stabilized material of claim 1 in which the said styrene-acrylonitrile copolymer is acrylonitrile-butadiene-styrene rubber.

11. The stabilized material of claim 1 in which said stabilizer compound is thiolbenzoic anhydride.

12. The stabilized material of claim 1 in which said stabilizer compound is thiollauric anhydride.

13. The stabilized material of claim 1 in which said stabilizer compound is thiololeic anhydride.

References Cited

UNITED STATES PATENTS

| | | | |
|---|---|---|---|
| 3,461,091 | 8/1969 | Stamm | 260—23 |
| 3,466,307 | 9/1969 | Stamm et al. | 260—399 |
| 3,479,315 | 11/1969 | Weisfeld | 260—30.8 |

DONALD E. CZAJA, Primary Examiner

R. A. WHITE, Assistant Examiner

U.S. Cl. X.R.

260—45.75, 45.95, 399, 502.6